United States Patent
Brändli et al.

(10) Patent No.: US 11,526,209 B2
(45) Date of Patent: Dec. 13, 2022

(54) TRANSPARENT SMARTPHONE

(71) Applicant: Sony Advanced Visual Sensing AG, Schlieren (CH)

(72) Inventors: Christian Brändli, Baden (CH); Raphael Berner, Confignon (CH); Michael Gassner, Zürich (CH)

(73) Assignee: Sony Advanced Visual Sensing AG, Zürich (CH)

( * ) Notice: Subject to any disclaimer, the term of this patent is extended or adjusted under 35 U.S.C. 154(b) by 0 days.

(21) Appl. No.: 17/421,163

(22) PCT Filed: Jan. 21, 2020

(86) PCT No.: PCT/IB2020/050452
§ 371 (c)(1),
(2) Date: Jul. 7, 2021

(87) PCT Pub. No.: WO2020/152585
PCT Pub. Date: Jul. 30, 2020

(65) Prior Publication Data
US 2022/0066552 A1 Mar. 3, 2022

Related U.S. Application Data

(60) Provisional application No. 62/794,765, filed on Jan. 21, 2019.

(51) Int. Cl.
*G06F 3/01* (2006.01)
*G06V 20/20* (2022.01)
(Continued)

(52) U.S. Cl.
CPC ............ *G06F 3/013* (2013.01); *G06T 15/205* (2013.01); *G06T 19/006* (2013.01); *G06V 20/20* (2022.01); *G06T 2215/16* (2013.01)

(58) Field of Classification Search
CPC ................................ G06F 3/013; G06V 20/20
See application file for complete search history.

(56) References Cited

U.S. PATENT DOCUMENTS

| 7,369,101 B2 | 5/2008 | Sauer et al. |
| 9,824,499 B2 | 11/2017 | Wright et al. |

(Continued)

FOREIGN PATENT DOCUMENTS

EP 2 983 140 A1 2/2016

OTHER PUBLICATIONS

International Preliminary Report on Patentability dated Jul. 29, 2021, from International Application No. PCT/IB2020/050452, filed on Jan. 21, 2020. 8 pages.
(Continued)

*Primary Examiner* — Shivang I Patel
(74) *Attorney, Agent, or Firm* — HoustonHogle LLP

(57) ABSTRACT

A method and system for rendering an augmented reality scene on a mobile computing device tracks a real-world scene and/or a viewpoint of a user with one or more event-based vision sensors and blends an augmented reality scene displayed on the mobile computing device based on the viewpoint of the user and a scene map of the real-world scene and on the tracking of the one or more event-based vision sensors. Event-based vision sensors offer many advantages, mainly by intrinsically compressing the data stream and thus reducing the amount of data that a processing unit needs to perform. Furthermore, the event-based vision sensor pixels continuously sense the visual changes in the scene and report them with a very low latency. This makes the event-based vision sensor an ideal sensor for always-on tasks such as visual tracking and smart sensor control or data enhancement of secondary sensing modalities.

15 Claims, 9 Drawing Sheets

(51) Int. Cl.
*G06T 15/20* (2011.01)
*G06T 19/00* (2011.01)

(56) References Cited

U.S. PATENT DOCUMENTS

| | | |
|---|---|---|
| 10,070,120 B2 | 9/2018 | Pedley et al. |
| 10,482,663 B2 | 11/2019 | Ghaly et al. |
| 2011/0285622 A1 | 11/2011 | Marti et al. |
| 2012/0212508 A1 | 8/2012 | Kimball |
| 2015/0123966 A1* | 5/2015 | Newman ............... G06T 19/006 345/419 |
| 2017/0352192 A1* | 12/2017 | Petrovskaya .......... G02B 27/01 |
| 2018/0096503 A1 | 4/2018 | Kaehler et al. |
| 2018/0191982 A1 | 7/2018 | Berner et al. |

OTHER PUBLICATIONS

International Search Report and Written Opinion of the International Searching Authority, dated Apr. 24, 2020, from International Application No. PCT/IB2020/050452, filed on Jan. 21, 2020. 14 pages.
Samini, A., "Perspective Correct Hand-Held Augmented Reality for Improved Graphics and Interaction," Linkoping studies in science and technology Dissertation No. 1931, 1-89 (2018).

* cited by examiner

TRANSPARENT SMARTPHONE

RELATED APPLICATIONS

This application is a § 371 National Phase Application of International Application No. PCT/IB2020/050452, filed on Jan. 21, 2020, which benefit under 35 USC 119(e) of U.S. Provisional Application No. 62/794,765, filed on Jan. 21, 2019, which are incorporated herein by reference in their entirety.

BACKGROUND OF THE INVENTION

Newer generations of handheld mobile computing devices, such as smartphones and tablets have expansive touchscreen displays. Their areas cover almost the entire front face of the devices. In fact, in some examples, the displays wrap around the sides of the devices.

At the same time, augmented reality (AR) applications programs (apps) executing on the mobile computing devices have become ubiquitous. These apps executing on the mobile computing devices overlay virtual content with images captured, typically, by rear-facing cameras of the devices.

SUMMARY OF THE INVENTION

Often, the rendering of the captured images and virtual content is performed from the perspective of the rear-facing camera. This has the effect of creating discontinuities between the image displayed around the periphery of the device's display and the surrounding environment, from the perspective of the user, i.e., the AR scene does not blend with the surrounding real world scene from the viewpoint of the user. This impairs the AR illusion since the captured images and the AR content are not aligned with respect to the surrounding environment and the same object may be seen twice, once on the device's display and once within the user's visual perspective.

Some have proposed to track the user's viewpoint and achieve better blending between the AR scene and the real world scene. If the device could display images that were calibrated based on the user's perspective, both in terms of magnification and position, then the device's display could blend into the surrounding environment creating an illusion of the device's transparency.

Successful blending requires high speed tracking of the user's viewpoint and real world scene by the mobile computing device. A critical figure of merit of machine vision systems is the latency, which is the time that passes between the moment the light is received and the moment the rendered AR scene is updated.

Event-based vision sensors offer many advantages, mainly by intrinsically compressing the data stream and thus reducing the amount of data that a processing unit needs to analyze. Furthermore, the event-based vision sensors' pixels continuously sense the visual changes in the scene and report them with a very low latency. This makes the event-based vision sensor an ideal sensor for always-on tasks such as visual tracking and smart sensor control or data enhancement of secondary sensing modalities.

In general, according to one aspect, the invention features a method for rendering an augmented reality scene on a mobile computing device. It comprises tracking a real-world scene and/or a viewpoint of a user with one or more event-based vision sensors and blending an augmented reality scene displayed on the mobile computing device based on the viewpoint of the user and a scene map of the real-world scene and on the tracking of the one or more event-based vision sensors.

In embodiments, the tracking of the real-world scene and/or the tracking of the viewpoint of the user comprises determining whether the viewpoint of the user has been displaced based on a front event-based vision sensor of the one or more event-based vision sensors and if deemed necessary acquiring additional information from a front depth sensor and/or a front camera to update the viewpoint.

In addition, the tracking of the real-world scene and/or the tracking of the viewpoint of the user can further comprise determining whether an object in the scene has moved based on a rear event-based vision sensor of the one or more event-based vision sensors and if deemed necessary acquiring additional information from a rear depth sensor and/or a rear camera to update the scene map.

Moreover, the tracking of the real-world scene and/or the tracking of the viewpoint of the user might further comprise determining whether a pose of the mobile computing device has changed based on information from an inertial measurement unit and/or an event-based vision sensor and, if deemed necessary, acquiring additional information from a rear depth sensor and/or a rear camera and/or an event-based vision sensor to update a scene map.

In general, according to one aspect, the invention features a mobile computing device. This device comprises a front sensor assembly, a rear sensor assembly, a display (such as a touch screen display), and a processor assembly monitoring the front sensor assembly and the rear sensor assembly. The processor assembly further executes an augmented reality app for rendering an augmented reality scene on the display. In operation, the processor assembly tracks a real-world scene and/or a viewpoint of a user with one or more event-based vision sensors of the front sensor assembly and/or the rear sensor assembly and blends an augmented reality scene displayed on the display based on the viewpoint of the user and a scene map of the real-world scene and on the tracking of the one or more event-based vision sensors.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
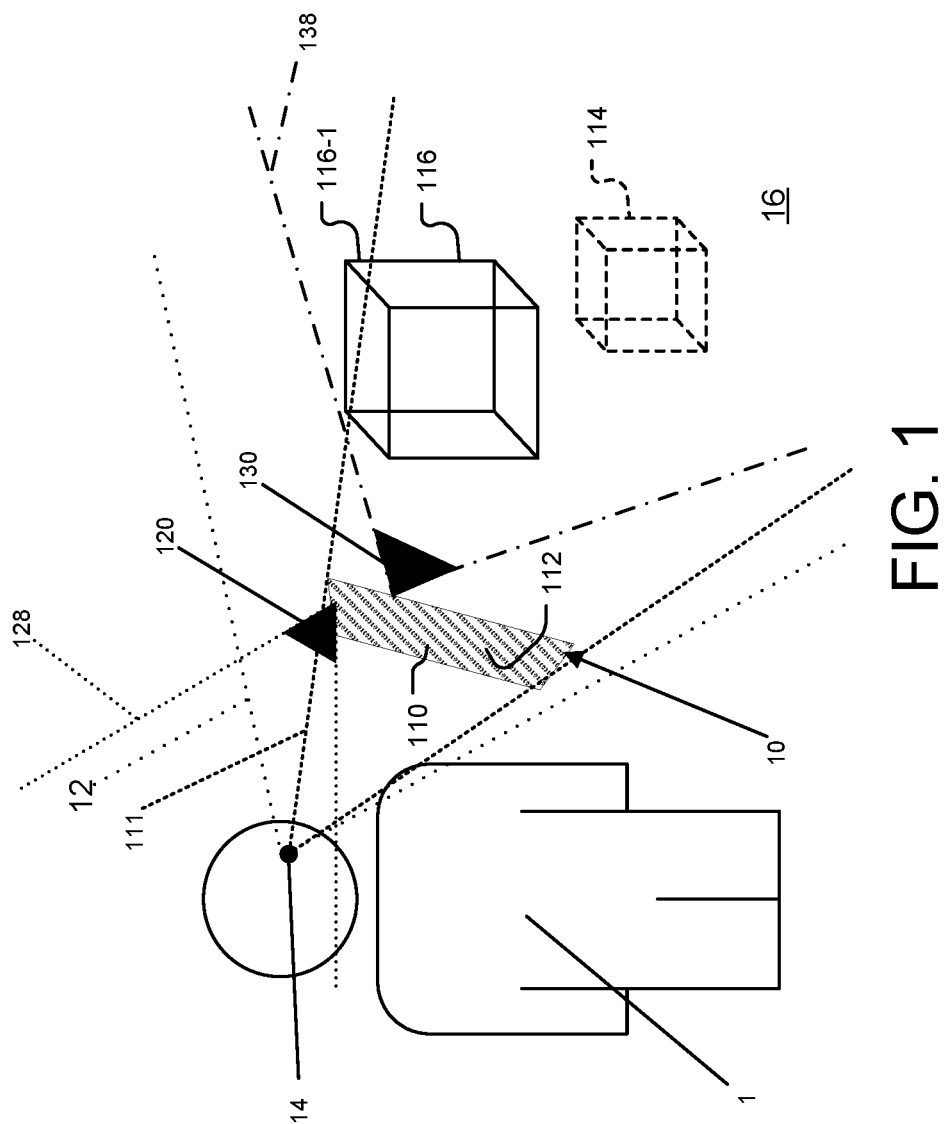
FIG. 1 is a schematic side view showing a user holding a mobile user computing device that is executing an augmented reality (AR) application.

FIG. 1 depicts a typical scenario. A user 1 views the surrounding environment characterized by the user's field of view 12. In the illustrated example, within that user's field of view 12 is a user device 10.

In the typical example, the user device 10 is a mobile computing device such as a smartphone or tablet computing device. Other devices include televisions, transparent displays (see-through displays), light field displays, holographic displays, projector based systems, 3d displays, stereoscopic displays, and automobile heads-up display systems.

As is common, the mobile computing device 10 often has a touch screen display 110. And, as also common to such devices, the user device 10 includes a front sensor assembly 120 and a rear sensor assembly 130.

The front sensor assembly 120 and the rear sensor assembly 130 have corresponding fields of view 128, 138. These fields of view 128, 138 are characterized by the fields of view of the various sensors that are included in each of these sensor assemblies 120, 130. In many cases, the individual sensors of these assemblies may have respective wider or narrower fields of view. However, for the purposes of the following description, the fields of view are treated collectively and generally coextensive with each other.

In the illustrated example, the user device 10 intersects a portion of the field of view 12 of the user 1. As a result, certain real world objects, such as the real world cube 116, will be fully or partially obscured by the body of the user device 10 as it obscures part of the user's field of view 12. Nevertheless, a portion 116-1 of this real world object 116 may still be directly observable by the user around an edge of the device 10.

The user device 10 in the typical example executes an augmented reality application. As a result, additional virtual objects 114 will be generated by that AR application executing on the user device 10 and displayed on the display 110.

In most AR applications, the AR scene 112 rendered on the display 110 of the computing device 10 will be a combination of the real world objects 116 that are captured by a camera of the rear sensor assembly 130 along with virtual objects 114 that are generated by the AR app and rendered in the AR scene 112.

As opposed to device-perspective rendering, where the display 110 shows the AR scene 112 from the perspective of the rear sensor assembly 130, the transparent smartphone AR app employs user-perspective rendering, which makes the AR scene 112 on the display 110 blend with the real world scene 16 when observed from the viewpoint 14 of the user 1. Hence, the AR scene 112 content is defined by the user-perspective-rendering field of view 111 defined as the portion of the scene obscured by the display 110 when viewed from the user viewpoint 14.

Often, the user viewpoint is deliberately not specifically the eye, since it can be the right, the left or even in between the user's eyes. The viewpoint can also change during the runtime, for instance, as a function of the user distance to the display 110. If close, the app executing on the device 10 might select a specific eye (dominant eye). Furthermore some displays, for example 3D displays, might require two viewpoints (left and right eyes).

Figure 2:
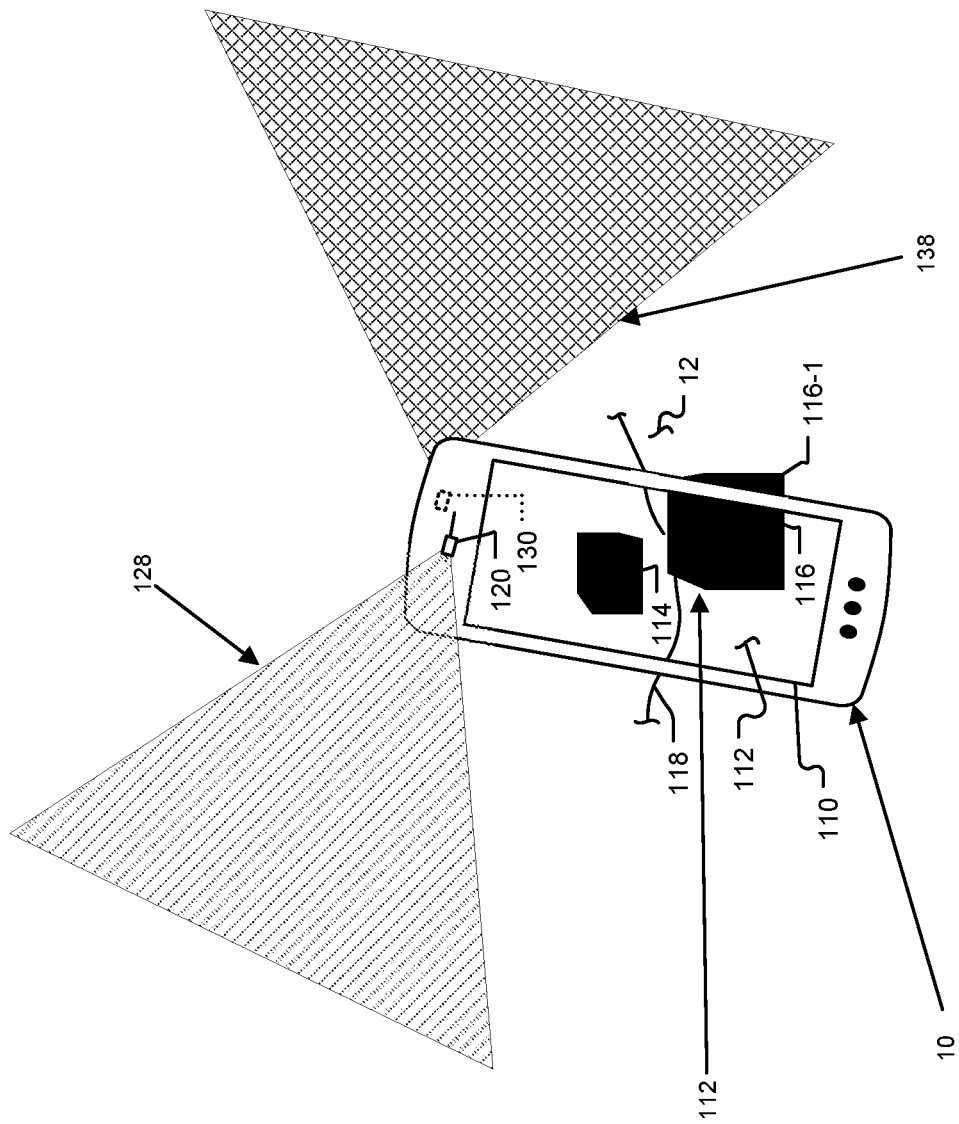
FIG. 2 is a schematic view of the mobile computing device displaying AR scene from the augmented reality application showing the blending of the AR scene with the real world scene within the user's field of view and viewpoint according to the present invention.

FIG. 2 shows the user device 110 from the perspective of the user 1. The AR scene 112 rendered on the display 110 includes a background AR scene that was captured by the rear sensor assembly 130. At the same time, the AR scene 112 contains virtual objects 114 that have been rendered along with the real objects 116.

In this user perspective display, the real world objects 116 might be partially observable 116-1 within the user's field of view. These real-world objects are displayed in a blended fashion so that from the standpoint of the user 1, the real world objects will be displayed within the AR scene 112 such that they are blended with the other parts of those objects that are directly observable. In addition, other features of the scene 118 will form part of a continuous scene with those same parts of the scene that are displayed in the AR scene 112 to yield the illusion of the transparency of the device 10.

Figure 3:
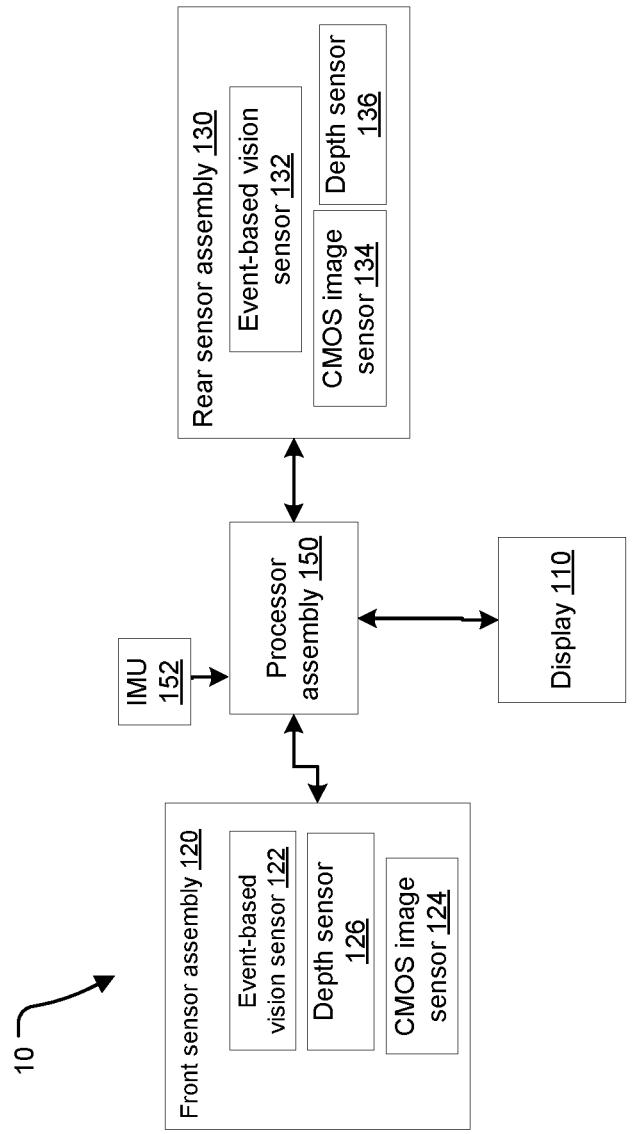
FIG. 3 is a block diagram showing components of the mobile computing device that relate to the present invention including the event-based vision sensors in the sensor assemblies of the device.

FIG. 3 shows the basic block diagram of the user device 10.

It includes a processor assembly 150. Often this includes a central processing unit and possibly a graphic processing unit. In addition, the processor assembly will include random access memory along with program memory. Typically, the AR app 115 will be loaded into the program memory of the processor assembly 150 for execution by the central processing unit.

In addition, it is also common for the device 10 to include an inertial measurement unit (IMU) 152. Often, these IMUs include magnetometers, accelerometers, and gyroscopes. These are used to determine the pose of the user device 10 by determining its orientation within the earth's gravitational field along with rotational and translational movement.

Also shown are exemplary front sensor assembly 120 and rear sensor assembly 130. In the typical example, the front sensor assembly includes a front event-based vision sensor 122, a front image sensor such as a CMOS image sensor 124, and a front depth sensor 126. In a similar vein, the rear sensor assembly 130 includes a rear event-based vision sensor 132, and a rear image sensor 134, and a rear depth sensor 136.

More generally, a list of possible depth sensor technologies for the front sensor assembly 120 includes but is not limited to structured light source and image sensor, time of flight (ToF) depth sensor, Lidar, Radar, stereo camera systems, stereo event-based vision sensor systems and all possible combinations of the latter.

List of possible sensors in the rear sensor assembly 130 possibly include (not limited to) structured light source and image sensor system, ToF sensor, Lidar, Radar, stereo camera systems, and stereo event-based vision sensor systems.

The processor assembly 150 typically via an integrated graphics processing unit drives the display 110 specifically to render the AR scene 112 as generated by the AR app 115.

Figure 4:
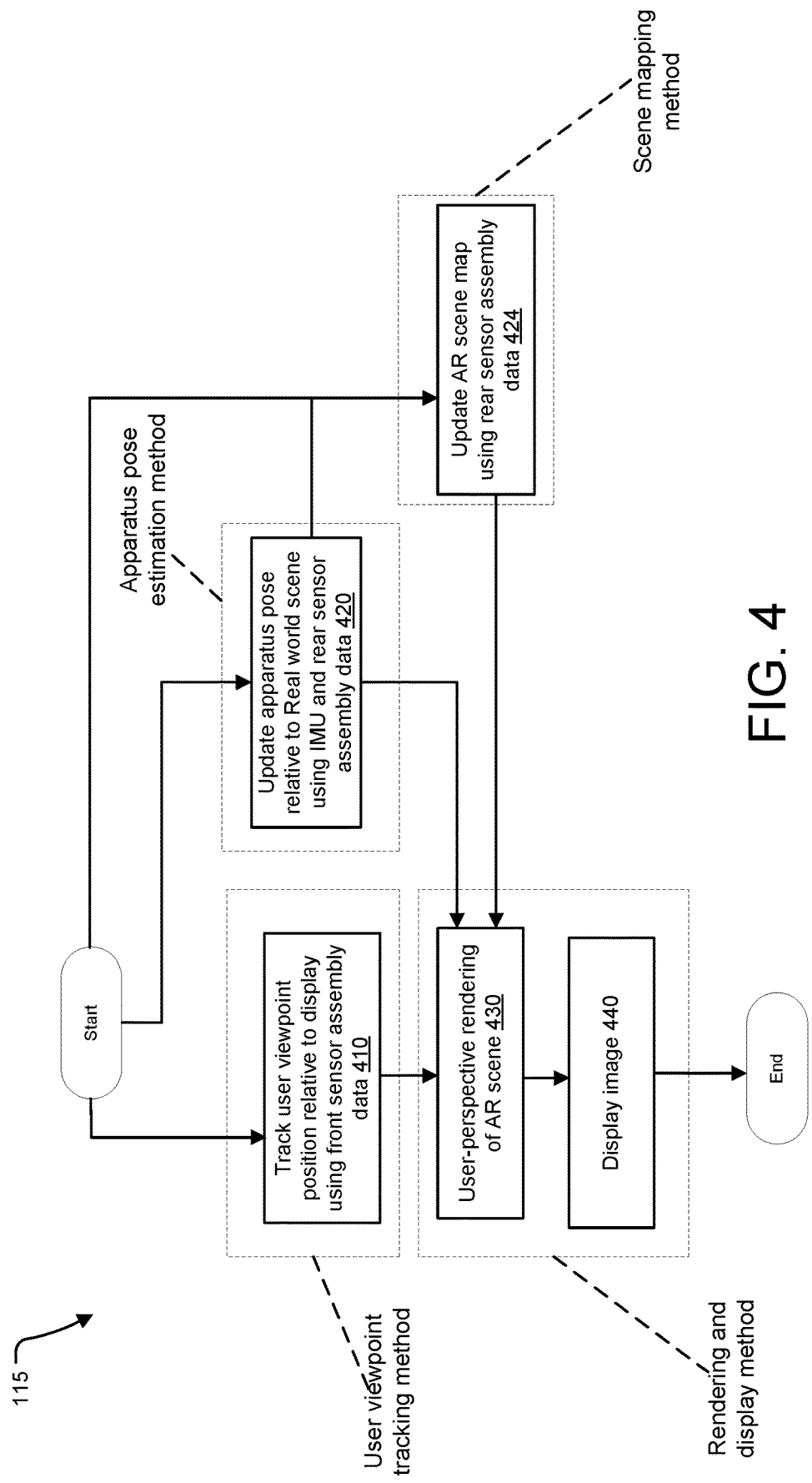
FIG. 4 is a flow diagram showing the operation of the AR application and its use of information from the front sensor assembly and the rear sensor assembly.

FIG. 4 is a flow diagram showing the operation of the AR app 115 in order to generate an AR scene 112 that is blended with the real world scene 16. Generally, the AR app 115 must resolve the user's viewpoint as captured by the front sensor assembly 120, the pose of the device 10, and map the real world scene 16 as captured by the rear sensor assembly 130.

The sub methods (dashed boxes) are typically running in separate threads and run at different update frequencies, but they can also be run sequentially. The rendering and display method for the user-perspective rendering of the scene can be performed using state of the art computer graphics theory and methods.

The rendering and display method could employ machine learning methods to more seamlessly blend the display with the scene. The method could adjust the display pixel brightness, contrast or further properties using for instance a deep neural network like a CNN. The rendering of the scene map images may also be improved or completely performed using machine learning (e.g. CNN). A possible training method may be mounting a camera between the user's eye (e.g. with using glasses) and then optimize for the smoothness in the transition from screen image to the background image.

In more detail, in step 410, the AR app 115 tracks the user's viewpoint position relative to the display 110 using the front sensor assembly 120.

Typically at the same time, in step 420, the AR app 115 updates the resolved pose of the device 10 relative to the real world scene 16 based on data from the inertial measurement unit (IMU) 152 and/or from the rear sensor assembly 130.

Further, often in parallel, the AR app 115 also receives the information such as images from the rear sensor assembly 120 and updates the scene map in steps 424.

In step 430, the AR scene 112 is resolved from the user perspective in step 430 and this AR scene 112 is then provided to the display 110 in step 440.

Figure 5:
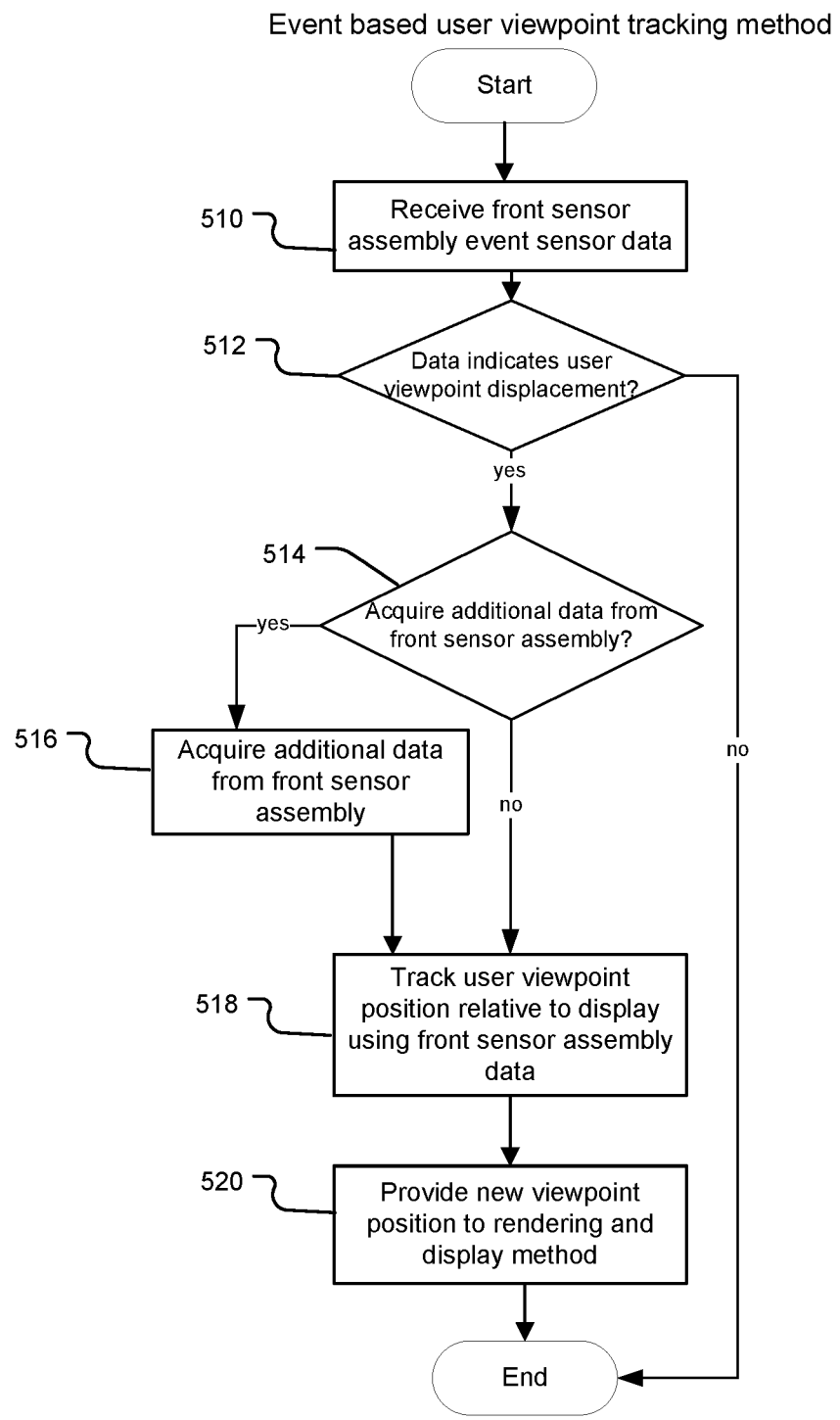
FIG. 5 is a flow diagram showing the use of the front event-based vision sensor to perform viewpoint tracking of the user.

FIG. 5 breaks-down the viewpoint tracking step 410 of FIG. 4.

In more detail, event-based vision sensor data is received from the front event-based vision sensor 122 of the front sensor assembly 120. Then, in step 512, this data is analyzed to determine whether the user viewpoint has displaced. For example, the data is analyzed by the processor assembly 150 to determine whether the user's gaze has shifted by determining eye movement. If analysis of the information from the front event-based vision sensor 122 indicates that there has been no viewpoint change in step 512, then no update to the user's viewpoint needs to be made.

These steps are based on, for example, observation of event counts or event rate in specific regions of interest to decide if a tracking update is necessary. This helps to save power since the more expensive tracking algorithm and potentially readings from further sensors are only executed when necessary.

The whole method can be executed at a fixed frequency or asynchronously for every event or every N-th event (where N can vary for different executions of the method) or every event packet or with any other suitable policy.

On the other hand, if it is determined that the viewpoint has displaced in step 512, then, in step 514, additional data is acquired from the front sensor assembly 120 in step 516. Specifically, the depth sensor 124 is often activated to determine whether or not the user has moved their head to change their direction of gaze and thus viewpoint. In addition, the images of the user are often captured by the front image sensor 124. These images are analyzed to determine whether or not the viewpoint of the user 1 has changed and determine what is the user's new viewpoint. Then, in step 518, the user's viewpoint position is updated and tracked relative to the display using the data from the front sensor assembly 122. In step 520, a new viewpoint position is provided to the AR app 115 so that the AR scene 112 can update so that it blends with the real world scene 16.

In general, the tracking can be based on events only or based on event data and other sensors data. In one embodiment at the beginning of the tracking and/or periodically one would acquire additional front image sensor and front depth sensor data for the detection of the viewpoint and or enhance the tracking procedure. In between, the viewpoint tracking happens solely based on event-based vision sensor data employing state of the art tracking algorithms, which allows for a very high update rate and low update latency due to the event-based vision sensor's low latency and high frequency data readout.

Figure 6:
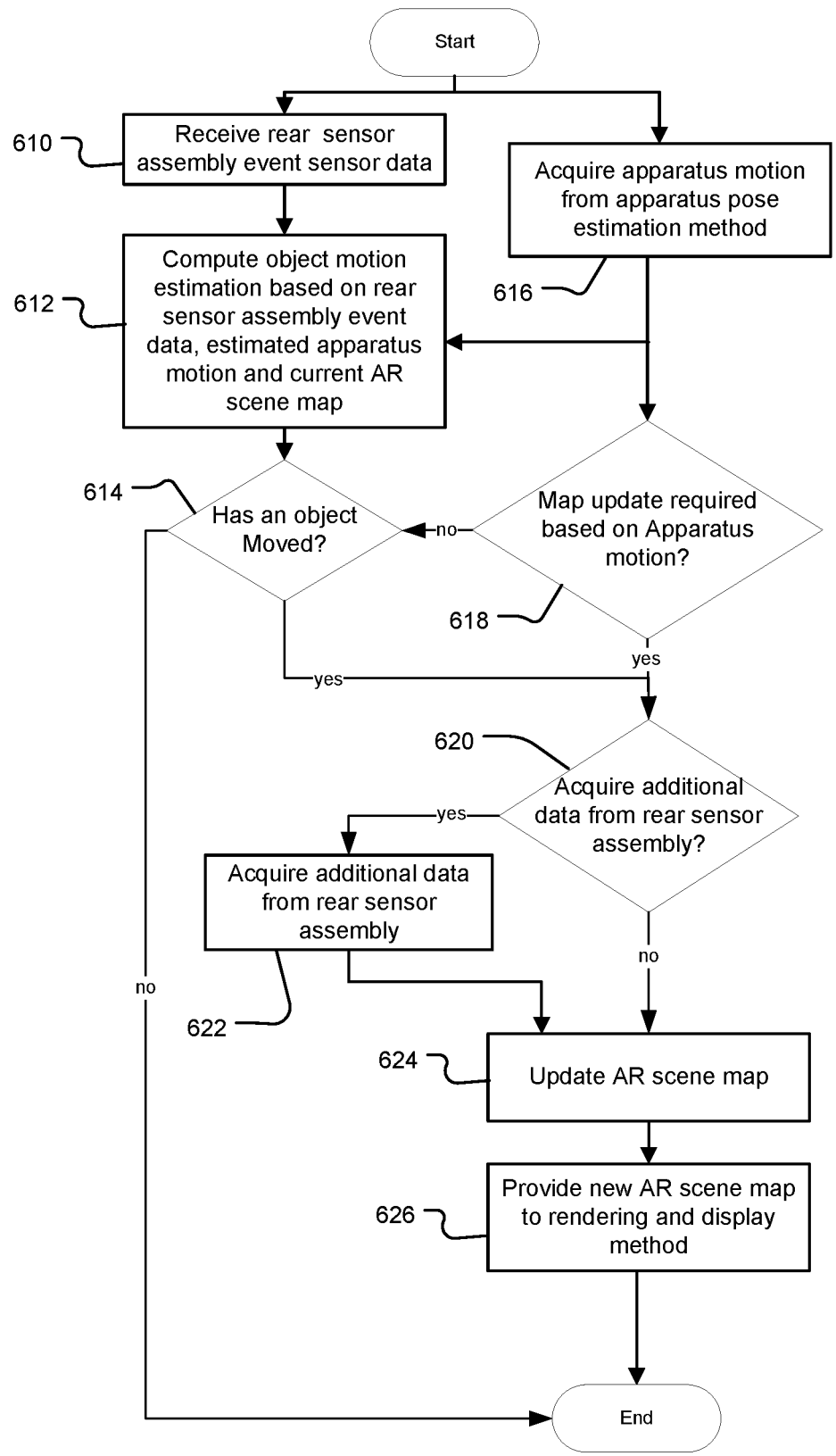
FIG. 6 is a flow diagram showing the use of the rear event-based vision sensor to perform scene mapping.

FIG. 6 shows the details of the scene mapping step 424 of FIG. 4.

In more detail, in step 610, AR app executing on the processor assembly 150 receives rear sensor assembly data from the rear event based vision sensor 132.

Preferably, instead of mapping the scene at a constant readout rate of the rear sensor assembly 130, this method only triggers expensive sensor readings and software updates when the real world scene 12 as observed by the rear sensor assembly 130 has changed due to motion of objects in the scene or of apparatus itself. The event-based vision sensor data is employed to sense object motion at high frequency and low latency.

The whole method can be executed at a fixed frequency or asynchronously for every event or every N-th event (where N can vary for different executions of the method) or every event packet or with any other suitable policy.

The processor assembly processes apparatus motion and pose estimation information in step 616.

In step 612, the AR app 112 identifies the various objects within the real world scene 16 and estimates their motion using the data from the rear event based vision sensor 132 and the estimated apparatus motion acquired in step 616 and the current AR scene map.

In step 614, the AR app assesses whether an object 126 in the real world scene 16 has moved or not. At the same time, it is determined whether a map update is required based on apparatus motion in step 618.

In either of these two events, it is determined whether additional data is required and that data is acquired from the rear sensor assembly in steps 620 and 622. From this information, in step 624, the AR scene map is updated and, in step 626, it is provided to the AR app 115 so that the AR scene 112 can update so that it blends with the real world scene 16.

Figure 7:
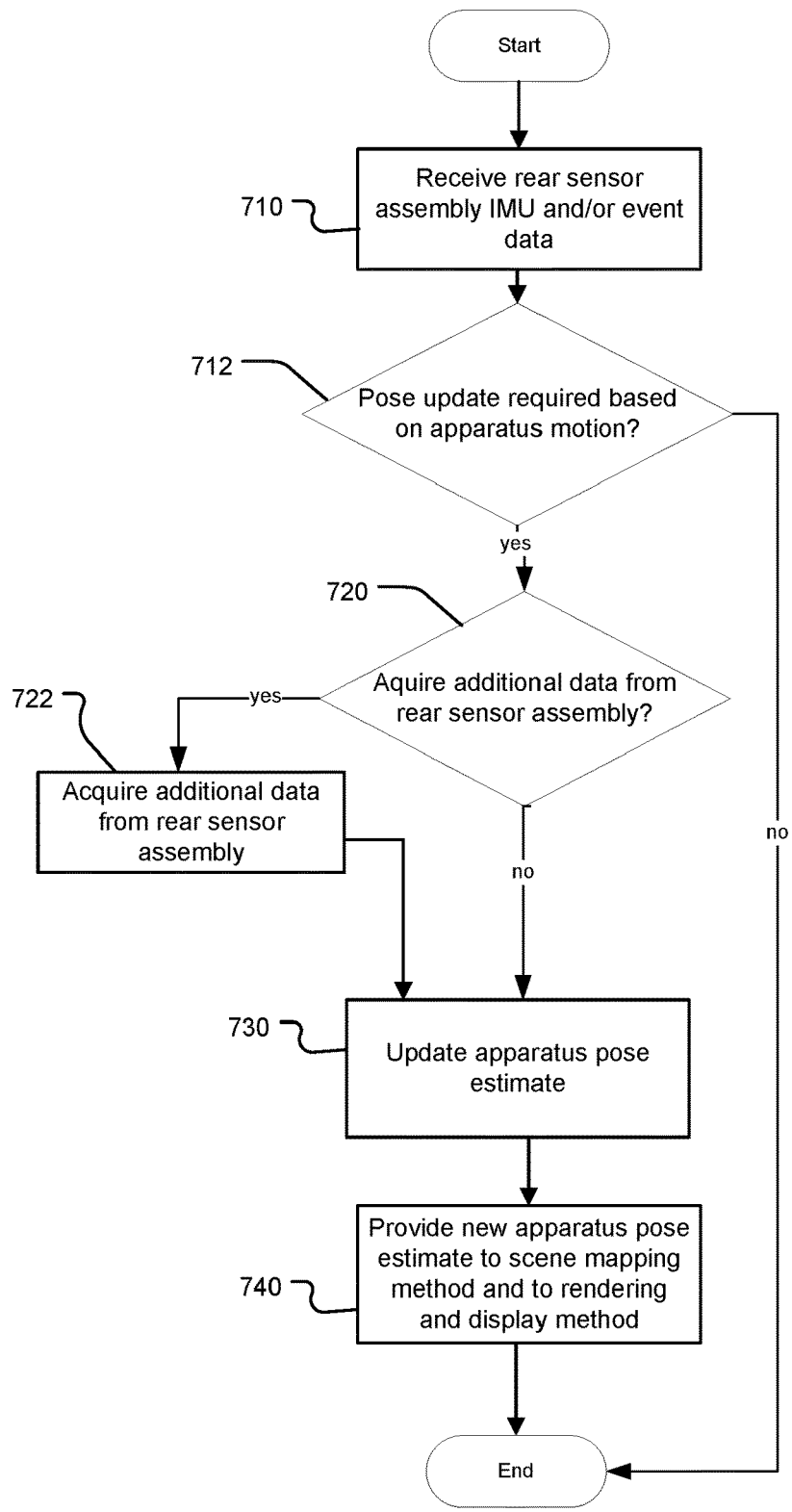
FIG. 7 is a flow diagram showing the use of the rear event-based vision sensor to perform device pose estimation.

FIG. 7 shows the details of the device pose estimation method of step 420 of FIG. 4.

In general, a state of the art SLAM (Simultaneous localization and mapping) method is used to estimate the position of the apparatus in space. The SLAM method estimates the apparatus motion constantly based on IMU readings. In order to reduce the pose estimation drift caused by integrating IMU measurement readings, which are subject to noise, the SLAM method periodically requires additional measurements from sensors allowing the measurement of absolute position. Event-based vision sensor data can be used for this purpose by, for instance, creating image frames using state of the art algorithms (intensity images and/or gradient images and/or edge images and/or event accumulation images) that allow the position estimation of the camera in space. The high update rate nature of the event-based vision sensor allows very high pose update rates, beneficial during fast motions of the apparatus. Also, the events might be used to enhance sensor data from other sensors, for instance the CMOS image sensor, by employing them for removing motion blur on the CMOS sensor image. Furthermore, events could be used to give the SLAM methods queues about the ego motion of the device, in the case where no IMU data is available. Also the event data reveal the SLAM pipeline information about moving objects in the scene, which can render the SLAM method more robust.

The whole method can be executed at a fixed frequency or every N-th IMU reading or asynchronously for every event or every N-th event (where N can vary for different executions of the method) or every event packet or with any other suitable policy.

In more detail, in step 710, the AR app 115 receives information from the IMU 152 and/or from the rear event-based vision sensor 132. Then in step 712, it is determined whether or not an update of the pose of the device 10 is required.

If an update is required then additional data from the rear sensor assembly including the rear event-based vision sensor 132 is acquired in steps 720 and 722. This information and/or the IMU data is used to update the estimation of the pose in step 730. Finally, new apparatus pose update is provided to the scene mapping method and the rendering method in step 740.

Figure 8:
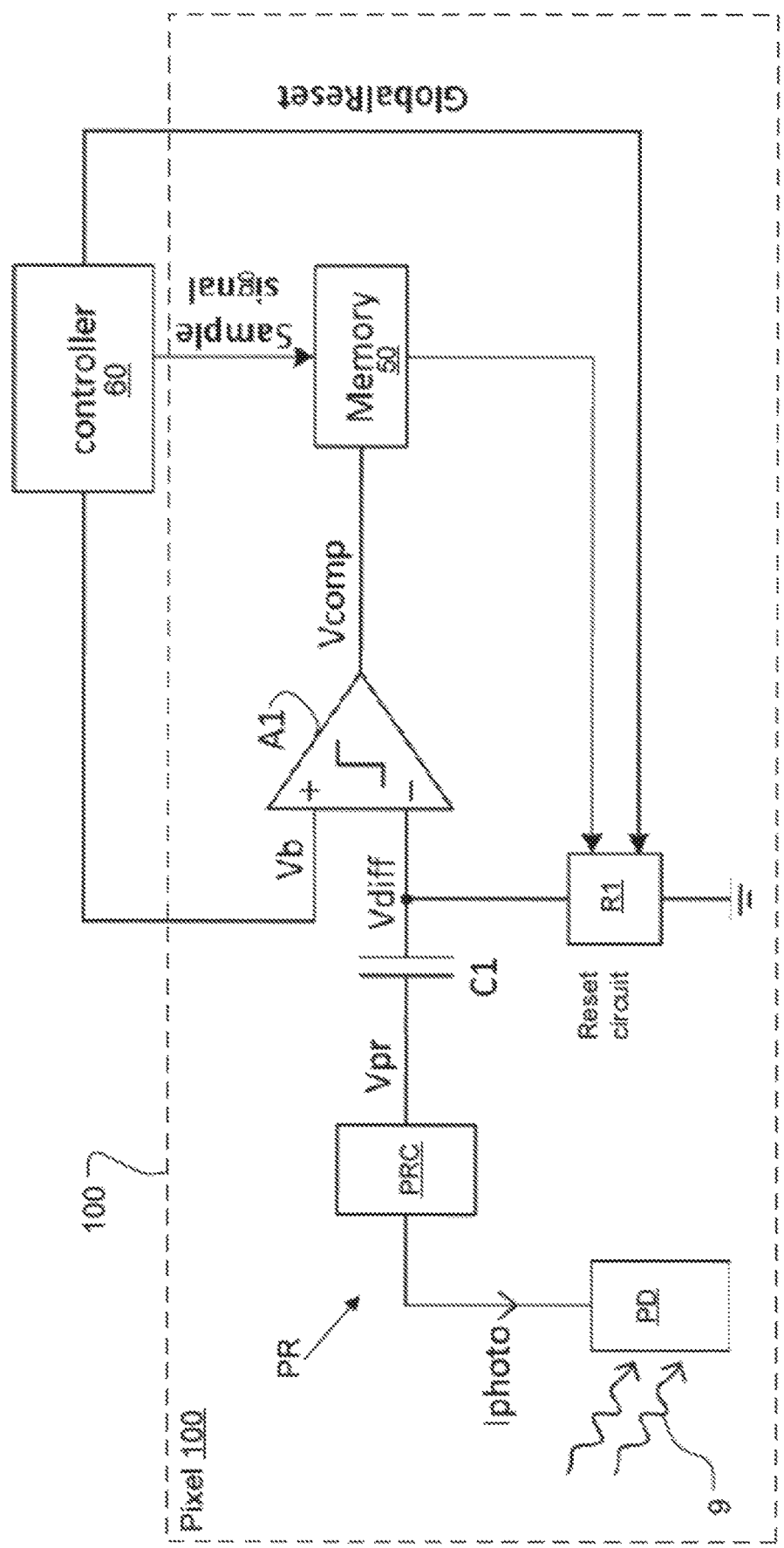
FIG. 8 is a circuit diagram showing the components and connections of a pixel circuit for an event-based vision sensor.

For background, FIG. 8 shows components of one possible pixel circuit 100, for the event-based vision sensors 122, 132.

The major components of a pixel circuit 100 are enumerated below.

1. Photoreceptor module. As shown in the figure, the pixel circuit contains a photodiode PD, or other photosensor, to measure impinging light 9 and convert the light intensity to current Iphoto; a photoreceptor circuit PRC to generate a photoreceptor signal Vpr dependent on the light intensity; and a memory capacitor C1 to remember past photoreceptor signal. The photosensor PD and photoreceptor circuit PRC constitute the photoreceptor module PR.

2. Memory capacitor C1: Receives the photoreceptor signal Vpr such that first plate of the capacitor carries a charge that is responsive to the photoreceptor signal Vpr and thus the light received by the photosensor PD. A second plate of the memory capacitor C1 is connected to the comparator node (inverting input) of A1. Thus the voltage of the comparator node, Vdiff, varies with changes in the photoreceptor signal Vpr.

3. Comparator A1: This is a means to compare the difference between current photoreceptor signal Vpr and past photoreceptor signal to a threshold. This comparator A1 can be in each pixel, or shared between a subset (for example a column) of pixels. In the preferred embodiment the comparator will be integral to the pixel, with each pixel having a dedicated comparator A1.

4. Memory: Memory 50 stores the comparator output based on a sample signal from a controller 60. Memory can be a sampling circuit (for example a switch and a parasitic or explicit capacitor) or a digital memory circuit (a latch or a flip-flop). In one embodiment, the memory will be a sampling circuit and each pixel will have two memories.

5. A conditional reset circuit R1: Condition for reset is a combination of the state of the memorized comparator output and a reset signal applied by the controller.

6. Peripheral circuit components: The comparator A1 and the memory 50 can be located in the pixel or in peripheral circuits (outside the pixel circuit).

The peripheral circuits contain the controller 60 which applies threshold signals to the comparator A1, sends control signals to memory 50 and selects times when the conditional reset circuit R1 becomes active.

The peripheral circuits may also contain a readout circuit RO which reads the content of the memory 50, determines if the light intensity for a given pixel has increased, decreased, or unchanged, and sends the output (computed from the current memory value) to a processor.

Generally, an OFF-event is a discrete decrease in light intensity for a given pixel. On the other hand, an ON-event is a discrete increase in light intensity for a given pixel.

In more detail, the comparator tells if light has increased/decreased. For OFF event: if Vdiff is lower than the threshold Voff (on Vb), the comparator output is high, and this level is stored in the memory. This means a decrease is detected. If Vdiff is not lower than the threshold, the comparator output is low: no decrease detected.

The only difficulty is that for ON-event, a low comparator output means an increase, while high means no change; but for OFF event high comparator output means decrease while low means no change.

So the readout must know the memory content and which threshold was applied. Or, as in the preferred embodiment, described later, there is an inverter for On so that the memory polarity is the same for both on and off.

In one preferred embodiment of the pixel circuit 100 of the present invention, each pixel circuit 100 contains one comparator only, which sequentially acts first as comparator for ON-events, then as comparator for OFF-events (or vice-versa).

The pixel circuit 100 and controller 60 operate as follows.

A change in light intensity received by the photosensor PD will translate to a change in photoreceptor signal Vpr. When the reset circuit R1 is not conducting, the changes in Vpr will be reflected also in the voltage Vdiff at a comparator node at the inverting input (−) to the comparator A1. This occurs because the voltage across the memory capacitor C1 stays constant.

At times selected by the controller 60, the comparator A1 compares the voltage at the comparator node at the second terminal of the memory capacitor C1 (Vdiff) to a threshold voltage Vb (from controller) applied to the non-inverting input (+) of the comparator A1.

The controller 60 operates the memory 50 to store the comparator output Vcomp. The memory 50 is typically implemented as part of the pixel circuit 100 as shown. In other embodiments, however, the memory 50 is implemented as part of column logic circuit (peripheral circuit, one per each column of the pixel array).

If the state of the stored comparator output held in the memory 50 indicates a change in light intensity AND the global reset signal GlobalReset signal from the controller 60 is active, the conditional reset circuit R1 is conducting. Here "AND" indicates the logical AND operator. With the conditional reset circuit R1 in a conductive state, the voltage at the comparator node at the inverting input of the comparator A1 (Vdiff) is reset to a known level. Thus, it stores the current photoreceptor signal Vpr on the memory capacitor C1.

Figure 9:
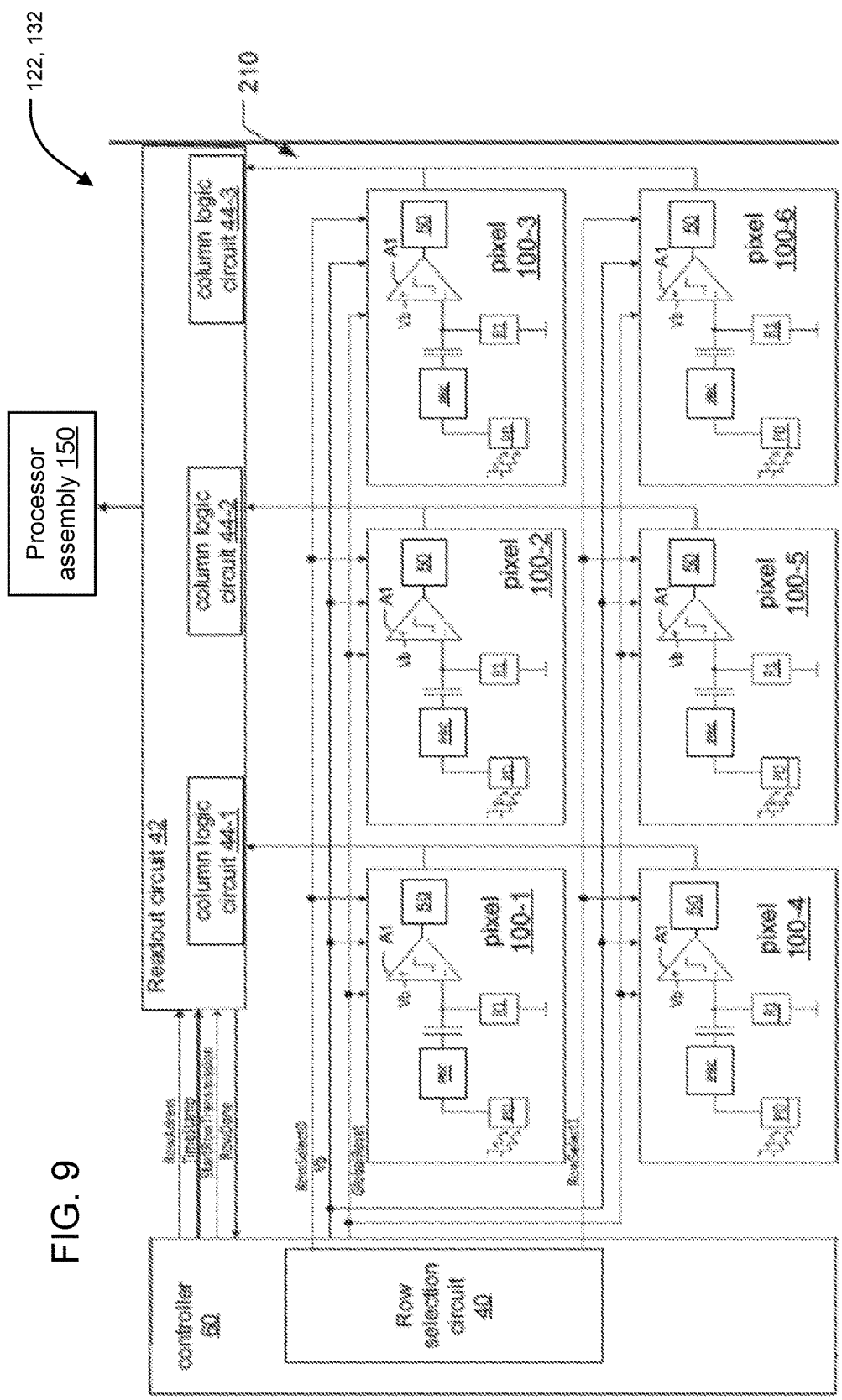
FIG. 9 is schematic diagram showing the layout of the event-based vision sensor with pixels arranged in a two-dimensional event pixel array of rows and columns.

FIG. 9 shows an exemplary event-based vision sensor 122, 132 comprising a two-dimensional array of pixels 100-1 through 100-6. The illustrated sensor shows only two rows and only three columns to avoid cluttering the figure. In practice the sensor 122, 132 would comprise of m rows (typically much greater than 2) and n columns (typically much greater than 3) of pixels. A pixel in a two dimensional array can be identified by its address which is the pixel's row number and column number. E.g., pixel 100-6 has row 2 (counting from top) and column 3 (counting from left) as its address.

The controller 60 controls pixels 100 and the other components such as the row selection circuit 40, the readout circuit 42, and transmission of data from the array to the processor assembly 150 and possibly a low power co-processor that handles the event-base vision sensor.

In the illustrated example, the row selection circuit 40 is shown as part of the controller 60. This row selection circuit 40 selects one or multiple subsets of rows. When a row of pixels 100 is selected, the comparator outputs of the pixels in the selected row are conveyed to the readout circuit 42.

The readout circuit 42 reads the data (the memorized comparator outputs) from the pixel array. Often the readout circuit 42 will further encode this data into a more efficient representation before transmitting to the processor assembly 150.

The readout circuit 42, divided into several column logic circuits 44-1 through 44-n, where there are n columns, determines from reading comparator outputs if the light intensity for the corresponding pixel has increased, decreased or remained unchanged.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for rendering an augmented reality scene on a mobile computing device, comprising:
   tracking a real-world scene and/or a viewpoint of a user with one or more event-based vision sensors; and
   blending an augmented reality scene displayed on the mobile computing device based on the viewpoint of the user and a scene map of the real-world scene and on the tracking of the one or more event-based vision sensors; and
   wherein the one or more event-based vision sensors detect OFF-events as discrete decreases in light intensity and/or ON-events as discrete increases in light intensity for pixels of the one or more event-based vision sensors and the one or more event-based vision sensors include comparators that compare a difference between photoreceptor signals and past photoreceptor signals to a threshold to determine the OFF-events and/or ON-events.

2. The method of claim 1, wherein the tracking of the real-world scene and/or the tracking of the viewpoint of the user comprises:
   determining whether the viewpoint of the user has been displaced based on a front event-based vision sensor of the one or more event-based vision sensors; and if deemed necessary based on event data from the front event-based vision sensor; and
   acquiring additional information to update the viewpoint.

3. The method of claim 2, wherein the additional information is generated by a front depth sensor and/or a front camera.

4. The method of claim 1, wherein the tracking of the real-world scene and/or the tracking of the viewpoint of the user comprises:
   determining whether an object in the scene has moved based on a rear event-based vision sensor of the one or more event-based vision sensors; and if deemed necessary; and
   acquiring additional information to update the scene map.

5. The method of claim 4, wherein the additional information is generated by a rear depth sensor and/or a rear camera.

6. The method of claim 1, wherein the tracking of the real-world scene and/or the tracking of the viewpoint of the user comprises:
   determining whether a pose of the mobile computing device has changed based on information from an inertial measurement unit and/or a rear event-based vision sensor of the one or more event-based vision sensors; and
   acquiring additional information from a rear depth sensor and/or a rear camera and/or a rear event-based vision sensor to update a scene map.

7. The method of claim 1, wherein the mobile computing device is a smartphone or tablet computing device.

8. A mobile computing device, comprising:
   a front sensor assembly;
   a rear sensor assembly;
   a display; and
   a processor assembly monitoring the front sensor assembly and the rear sensor assembly and executing an augmented reality app for rendering an augmented reality scene on the display, wherein the processor assembly tracks a real-world scene and/or a viewpoint of a user with one or more event-based vision sensors of the front sensor assembly and/or the rear sensor assembly, and blends an augmented reality scene displayed on the display based on the viewpoint of the user and a scene map of the real-world scene and on the tracking of the one or more event-based vision sensors, and wherein the one or more event-based vision sensors detect OFF-events as discrete decreases in light intensity and/or ON-events as discrete increases in light intensity for pixels of the event-based vision sensors and the event-based vision sensors include comparators that compare a difference between photoreceptor signals and past photoreceptor signals to a threshold to determine the OFF-events and/or ON-events.

9. The device of claim 8, wherein the processor assembly tracks the real-world scene and/or the viewpoint of the user by determining whether the viewpoint of the user has been displaced based on a front event-based vision sensor of the front sensor assembly and if deemed necessary acquiring additional information.

10. The device of claim 9, wherein acquiring additional information includes acquire information from a front depth sensor and/or a front camera of the front sensor assembly to update the viewpoint.

11. The device of claim 8, wherein the processor assembly tracks the real-world scene and/or the viewpoint of the user by determining whether an object in the scene has moved based on a rear event-based vision sensor of the one or more event-based vision sensors and if deemed necessary acquiring additional information.

12. The device of claim 11, wherein acquiring additional information includes acquire information from a rear depth sensor and/or a rear camera to update the scene map.

13. The device of claim 8, wherein the processor assembly tracks the real-world scene and/or the viewpoint of the user by determining whether a pose of the mobile computing device has changed and acquiring additional information if deemed necessary.

14. The device of claim 13, wherein acquiring additional information includes acquiring additional information from an inertial measurement unit and/or a rear depth sensor and/or a rear camera to update a scene map.

15. The device of claim 8, wherein the mobile computing device is a smartphone or tablet computing device.

* * * * *